UNITED STATES PATENT OFFICE.

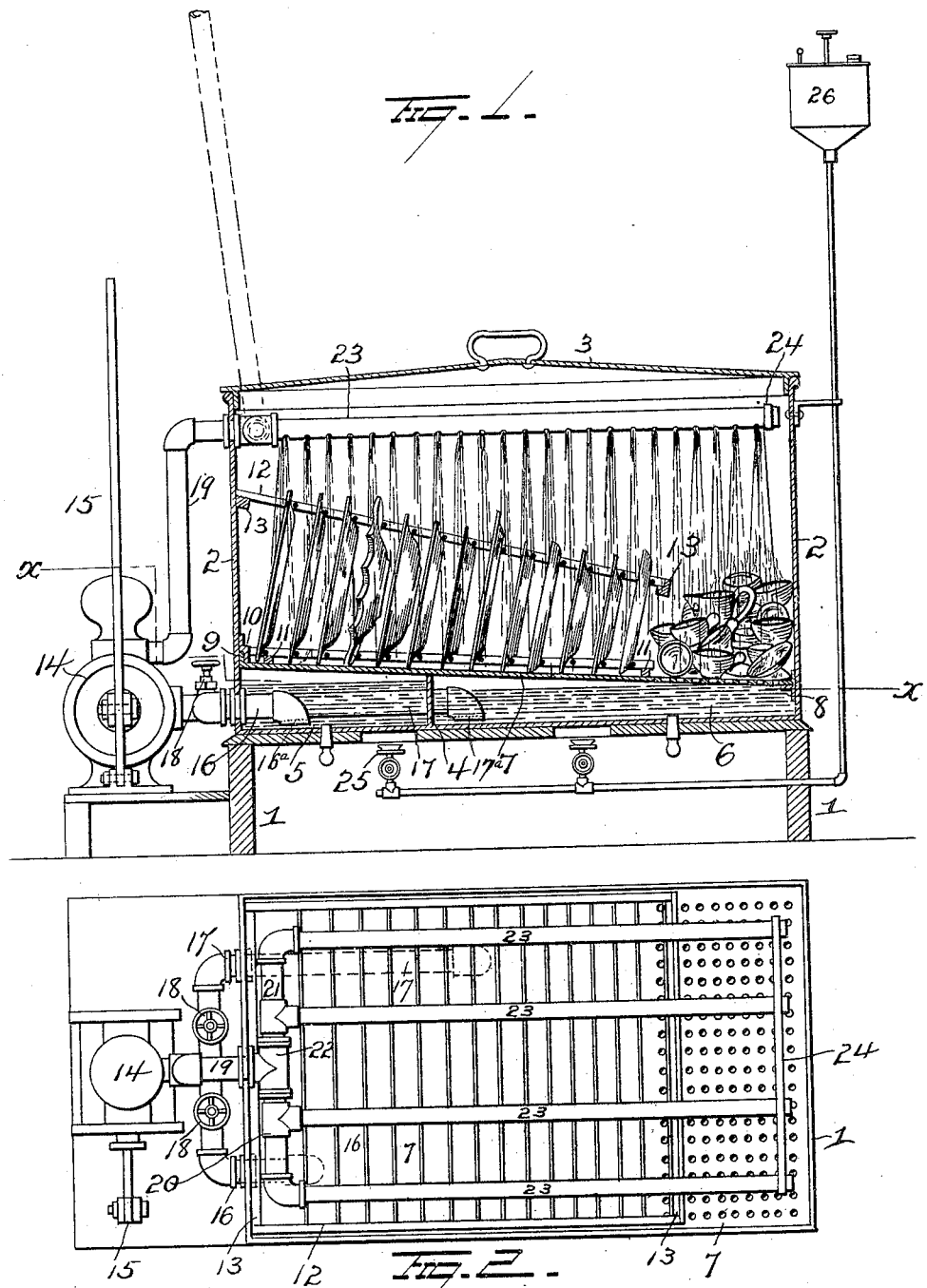

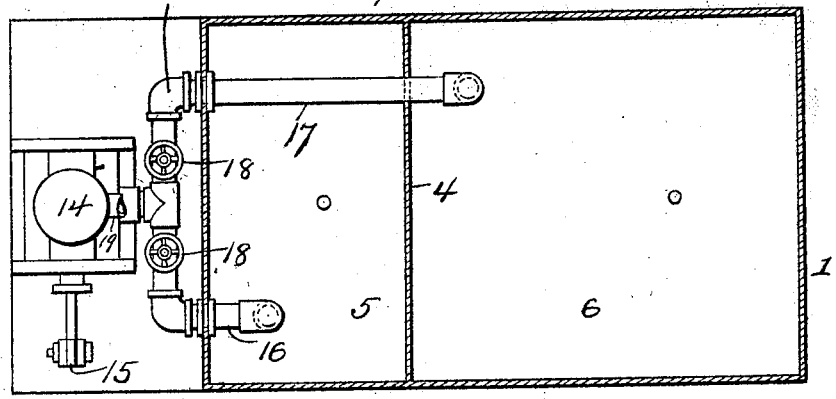
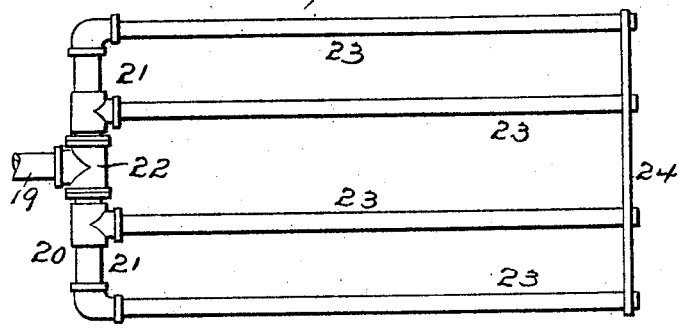
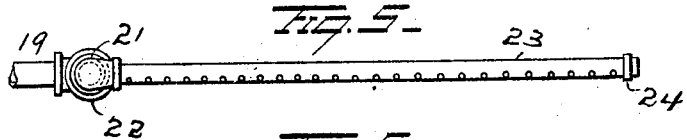
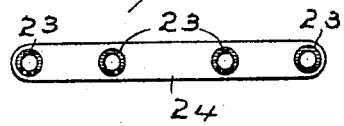

NELLIE G. DE LANEY, OF GRAND FORKS, NORTH DAKOTA.

DISH-WASHING APPARATUS.

No. 803,097.     Specification of Letters Patent.     Patented Oct. 31, 1905.

Application filed November 23, 1904. Serial No. 234,050.

*To all whom it may concern:*

Be it known that I, NELLIE G. DE LANEY, a resident of Grand Forks, in the county of Grand Forks and State of North Dakota, have invented certain new and useful Improvements in Dish-Washing Apparatus; and I do hereby declare the following to be a full, clear, and exact description of the invention, such as will enable others skilled in the art to which it appertains to make and use the same.

My invention relates to an improved dish-washing apparatus; and it consists in certain novel features of construction and combinations and arrangements of parts, as will be more fully hereinafter described, and pointed out in the claims.

In the accompanying drawings, Figure 1 is a view in vertical longitudinal section, illustrating my improvements. Fig. 2 is a top plan view with cover removed. Fig. 3 is a view in horizontal section on the line $x$ $x$ of Fig. 1, and Figs. 4, 5, and 6 are detail view of the spraying-frame.

1 represents a supporting-table, and 2 a tank or receptacle thereon, preferably of galvanized iron, although it may be constructed in any approved manner and of a size and shape to suit varying conditions and provided with a suitable removable cover 3. The tank or receptacle 2 is provided in its bottom with a vertical partition-wall 4, dividing the bottom portion of the tank or receptacle into two chambers or compartments 5 and 6, the compartment 6 preferably of about twice the size of chamber 5. Above compartments 5 and 6 is an inclined partition or tray 7, supported on a flanged bracket 8 at its lower end on partition 4 between its ends and having an upturned flange 9 at its highest end, projected beneath a depending lip 10 on the end of the tank to prevent possibility of the water entering chamber 5. The lower portion of tray 7 over compartment 6 is perforated to permit the water to readily pass into the latter.

A wire frame 11, having parallel laterally-running wires, rests on tray 7 and prevents slipping of the disks during the washing operation, and some distance above frame 11 is a similar frame 12, supported on cleats 13 and located at a much greater incline than frame 11 and adapted to hold plates of various diameters, as is clearly shown.

14 represents a force-pump operated by a lever or handle 15 and connected by pipes 16 and 17, respectively, with the compartments 5 and 6, and valves 18 are provided in said pipes and may be opened or closed at the will of the operator. The pump forces the water through a pipe 19 into a pipe-frame 20, comprising three (more or less) longitudinal pipes 23, connected at one end by a pipe 21, having a rotary connection with a pipe-coupling 22 at the ends of pipe 19, and the opposite ends of pipes 23 are closed and connected by a cross-bar 24. These pipes 23 are perforated throughout their lower portions and adapted to direct the water down onto the dishes and other articles to effectually clean them.

If desired, burners 25 may be provided for heating the water in the tank and any approved form of reservoir 26 may be provided for supplying the burners with liquid fuel.

In operation the plates are arranged in the wire frames 11 and 12, and the cups and like miscellaneous dishes, knives, forks, spoons, &c., are placed on the perforated portion of tray 7, the pipe-frame 20 being first swung to a vertical position to permit the insertion of the articles to be washed. The pipe-frame is then lowered to a horizontal position and the cover 3 placed on the receptacle or tank 2, when the apparatus is ready for operation. The operator then moves the pump-handle a few strokes to direct the soapy water in compartment 6 onto the dishes and the handle is allowed to rest for a few minutes for the suds forced upon the dishes to sink into the soiled parts of the articles. After a little soaking the handle is operated again until the dishes are thoroughly washed. The valve 18 in pipe 17 is then closed and the valve 18 in pipe 16 opened, and when the pump is again operated clear rinsing-water from compartment 5 will be forced through the pipe-frame and be directed down upon the articles in the tank. After the articles are thoroughly rinsed the cover 3 is removed to permit the escape of steam and the dishes to dry, when they can be removed and put away in a thoroughly clean and dry condition.

At the inlet ends of pipes 16 and 17 suitable screens 16ª 17ª are preferably provided to prevent the passage of foreign matter into the pump, which might injure the same and interfere with the perfect operation of the apparatus.

A great many slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In an apparatus of the character described, the combination with a receptacle, of two separated compartments in the bottom of the receptacle for soapy and clear water respectively, a fixed inclined tray over said compartments and having perforations at one end to direct water into the soapy-water compartment, and means for taking water from either of said compartments and forcing it onto the articles in the receptacle.

2. In an apparatus of the character described, the combination with a receptacle, of compartments in the bottom of the receptacle for soapy and clear rinsing-water respectively, an inclined tray disposed over said compartments and having a perforated lower end to direct water into the soapy-water compartment, frames over the tray to support dishes edgewise upon the tray, and a pump communicating with both of said compartments and means communicating with said pump to discharge water downwardly onto the dishes on the tray.

3. In an apparatus of the character described, the combination with a receptacle, of two compartments in the bottom of the receptacle for soapy and clear water respectively, means for supporting dishes edgewise above the compartments, a hinged pipe-frame in the top of the receptacle perforated on the under side to direct water downward onto the articles in the receptacle, and a pump communicating with both of said compartments and with the pipe-frame to force water to and through the latter from either of said compartments.

4. In an apparatus of the character described, the combination with a receptacle, of compartments in the bottom of the receptacle for soapy and clear water, an inclined partition or tray covering the compartments and perforated at its lower end above the soapy-water compartment, inclined wire frames above the tray for supporting dishes to be washed, a perforated pipe-frame in the top of the receptacle, a force-pump outside the receptacle, inlet-pipes connecting the pump with both compartments, valves in said pipes, and an outlet-pipe connecting the pump with the pipe-frame.

5. In an apparatus of the character described, the combination with a receptacle, of two compartments in the bottom of the receptacle for soapy and clear water, respectively, a heater under each of said compartments, and a pump communicating with both of said compartments and adapted to take water from either of them and discharge the same onto the articles in the receptacle.

In testimony whereof I have signed this specification in the presence of two subscribing witnesses.

NELLIE G. DE LANEY.

Witnesses:
F. H. DEUTMEYER,
C. F. HOLMES.